INVENTORS
HEINZ FÖRSTER
REINHOLD SEIDLER

United States Patent Office 3,346,359
Patented Oct. 10, 1967

3,346,359
APPARATUS FOR CONTINUOUS MANUFACTURE OF CONTINUOUS PROFILED GLASS MEMBERS
Heinz Forster, Pirna, and Reinhold Seidler, Pirna-Copitz, Germany, assignor to Veb Guss- und Farbenglaswerke Pirna-Copitz, Pirna-Copitz, Germany
Filed Apr. 3, 1963, Ser. No. 270,403
7 Claims. (Cl. 65—183)

This invention relates to a method and to an apparatus to carry out the same, for the continuous manufacture of continuous profiled glass members, particularly for building purposes. The members used for buildings can be reinforced with stabilizing or reinforcing elements, consisting primarily of wire or wire mesh.

Thus it is one of the objects of the invention to make available a larger and more varied selection of glass profiles of a higher quality. The novel profiled glass members feature improved accuracy in measurements, surface grade and optical properties, with savings in the required production time and, thus, in manufacturing costs.

It is known to process a glass mass continuously leaving the furnace in a rolling process, by means of a pair of rollers, and to shape it into a flat band of uniform thickness and width. This band is thereupon formed, while still in a malleable state, by means of shaping devices and in several operations, so that it is given the desired cross-section corresponding to the glass profile to be manufactured. Subsequently, the profile so obtained is cooled off in a cooling furnace to room temperature.

It is also known to press wires or wire mesh into the still malleable glass band, improving thereby the mechanical properties of the profiled glass members.

Various devices are known to carry out such procedure. It is known, for example, to arrange guiding lugs or adjustable guiding rollers behind the roller pair serving to produce the glass band, said guiding rollers being at first flat and gradually assuming shapes more and more in conformity with the cross-section to be achieved. The guiding rollers are followed by a conveyor line consisting of rollers and guiding the material through the cooling furnace.

Furthermore, a structure is known in which shaping elements are positioned between the roller pair and the cooling furnace, said elements physically defining the glass band at the shaping position over the whole profile cross-section. The shaping elements consist of cores which move at the speed of the glass band and impart the inner profile, as well as of a plurality of rotating shaping rollers which produce the outer profile. The surface speed of the latter substantially corresponding to that of the band itself for all parts coming into contact with the band. These shaping elements can be preceded by guiding members which prepare the shaping to be carried out.

When such a known method and a device therefor is used, the glass is shaped by means of several rolling steps following each other until a finished profiled glass member is achieved. At the same time the glass is gradually cooled off and it loses its malleability. The glass may become liable to inner stresses especially due to excessive rolling speeds, leading to warpage, cracks and other faults which make the glass profile unusable.

Difficulties are most frequently encountered in the production of profiled glass members reinforced with wire mesh. During the process of pressing of the mesh into the band, the temperatures are still very high, to ensure that the two elements are bonded into a uniformly homogeneous material. However, during the subsequent rolling steps, this bond is again destroyed to a considerable degree inasmuch as the wire mesh stretches only very little in comparison to glass, thus greatly impairing the physical properties of such glass profile.

It is also known to press corrugated wire mesh into the glass band in order favorably to influence the stretching process. Such a measure adds, however, to the total manufacturing cost without completely eliminating this problem.

Consequently, the permissible rolling speed during the shaping of the profile cross-section is decisive for the performance of the whole apparatus. However, since this speed is relatively low and is well below the output capacity of the melting furnace, especially in the case of complicated profile cross-sections, the production costs of such profiled glass members are still very high, making their application limited.

These and other difficulties of hitherto known processes and devices necessitated developing a new approach which would make it possible to set the rolling speed for the production of continuous glass profiles without the occurrence of undesirable stresses and to adjust it to the optimal output of the melting furnace.

These and other objects related thereto have been successfully solved by the new method and apparatus according to the present invention.

According to one of the major features of the invention, the cross-section of the produced profiled glass member is produced by a single roller pair whose pass takes up the pressure of the molten glass stream with an approximately uniform pressure. The mass of the glass being rolled is cooled off to a temperature which is afterwards maintained in the profile member being manufactured, without exerting any undesirable influence on the structure of the glass itself.

Simultaneously with the production of the desired cross-section of the profile member, the surface thereof can be patterned.

According to another important feature, the surface temperature of the roller pair is held a constant temperature below that of the molten glass. This, on the one hand, enhances the life span of the rollers and, on the other hand, assures a constant quality grade thanks to the even cooling of the profiled glass member.

To improve the physical properties of the profiled members, reinforcing elements can be introduced into the molten glass before it enters between the rollers. After the completed rolling step, the profiled members which are still in a malleable state are held at a stable temperature and additionally levelled to remove deformations that may have occurred. The speed during the rolling step is continuously adjustable in relation to the level of the melting furnace.

The present invention provides for a considerable increase in rolling speed, thus permitting an important boost in productivity, since the profile members are being produced directly from the molten mass in a single rolling operation. Moreover, the improvement in quality is accompanied by an increase in selection of various profile shapes since patterning of all surfaces and profiling on all sides is made possible. The applicability of profiled glass members is thus significantly increased, making these members accessible to a wider sector of consumers.

The apparatus according to the invention includes a collecting trough for the stream of molten glass, whose port is directly adjacent the roller pass and is shaped similarly thereto but has a greater depth. Guiding blocks may be employed in the port to achieve such a structure. A feed trough, preferably heated, leads from the melting furnace to the collecting trough; it is provided with a shut-off member.

In order to maintain the profiled glass member in a malleable state after it leaves the roller pair, and to level or adjust it subsequent to minor deformations, one or more levelling rollers are arranged beyond said pair of rollers, and are provided with passes congruent with that of the roller pair.

The collecting trough, the roller pair and the pairs of levelling rollers are made into a self-contained and interchangeable unit in order to cut down the production stoppages during breakdowns and, above all, when changing over to other profiles. Such a unit can be interchanged in the shortest possible time with another pre-assembled one.

The invention also contemplates the use of several roller pairs at the collecting trough. In such an apparatus, only a single pass form is needed for each profile to be produced, the total number of roller pairs, including the guiding roller pairs, being considerably lower than in the structures known for the conventional processes. Thus the costs for the whole installation are considerably lower.

Thanks to the moderate cost of the total installation and the higher productivity of the inventive process accompanied by an increase in the quality of the product and widening of the selection, it is possible to offer a better and cheaper product, and one more suited to the needs of the customers.

Other objects and many of the attendant advantages of the invention will be readily appreciated as the same becomes better understood by reference to the following detailed description, when considered with the accompanying drawings, wherein FIG. 1 is a somewhat schematic, partly sectional, side view of an apparatus according to the invention for the continuous manufacture of continuous profiled glass members, provided with a feed mechanism for a reinforcing element;

Figure 1:
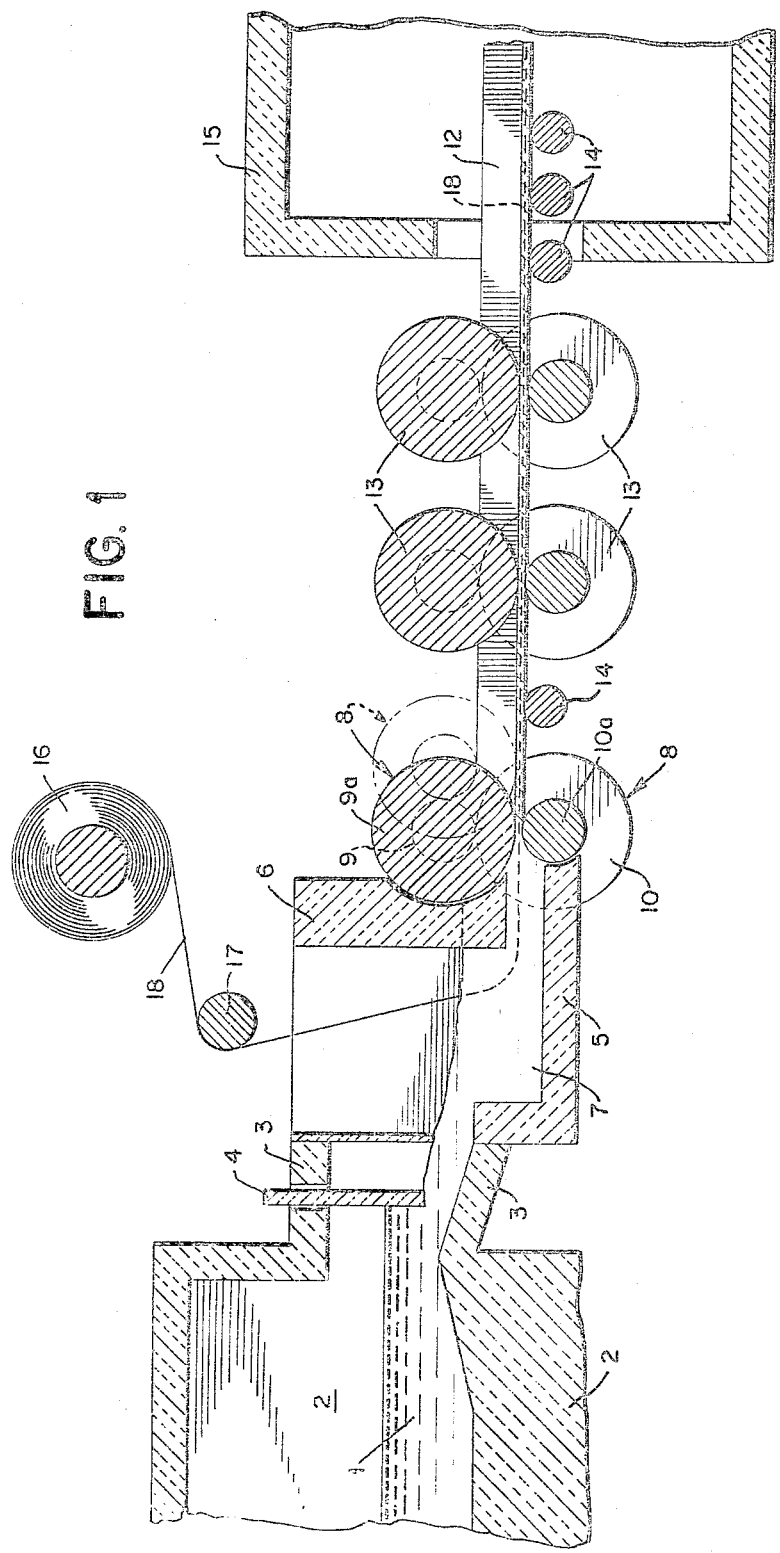
Figure 2:
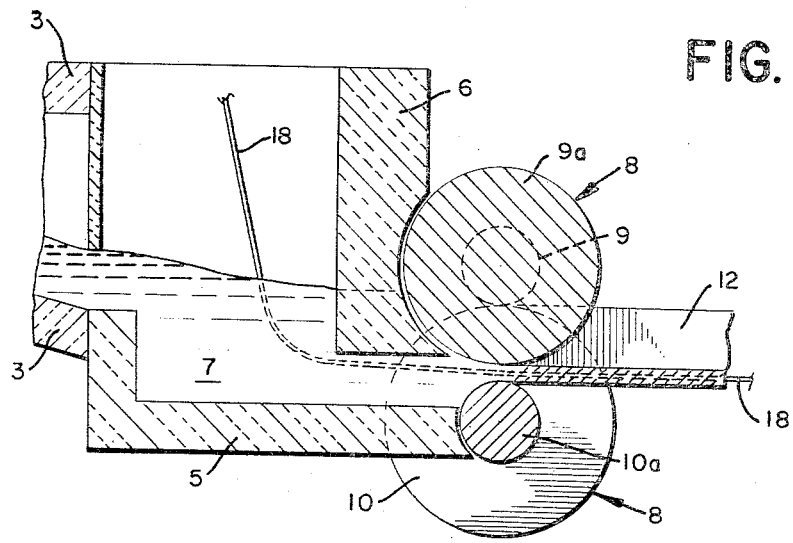
FIG. 2 is a sectional view of a collecting trough and a pair of rollers, as shown in the apparatus of FIG. 1.

In the drawings, and more particularly in FIGS. 1 and 2, a melting furnace 2 is shown which contains a glass melt 1. A feed trough 3 is arranged between the furnace 2 and a heated collecting trough 5. The trough 3 is provided with a shut-off member 4, preferably in the form of a slide plate adjustable to various levels. This allows adjustment of the stream of the glass melt administered from the furnace 2 to the feed trough 3 and thence to the collecting trough 5.

A roller pair, consisting of an upper roller 9, 9a and a lower roller 10, 10a is arranged adjacent the outlet end of the trough 5. As will better be understood from FIG. 3, the upper roller has an enlarged central portion 9a while the lower roller is provided with a proportionately narrowed central portion 10a. As explained hereunder, these portions 9a, 10a co-operate in forming a pass 11 for the glass melt.

The upper roller 9, 9a is preferably arranged so that it can be offset with relation to the lower roller 10, 10a, as shown in dot-dash lines in FIG. 1. The roller pair 8 is, therefore, provided with a swivelling arrangement (not shown).

Figure 3:
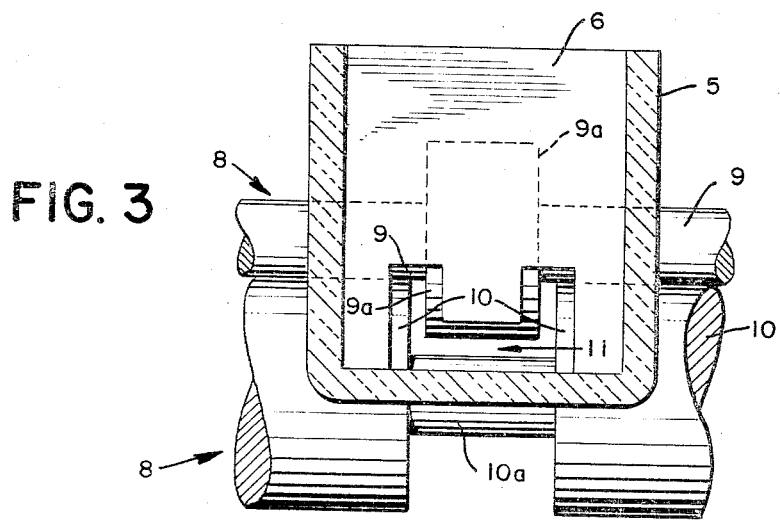
FIG. 3 is a transverse sectional view showing the collecting-trough port and the pass of the pair of rollers.

The port of the collecting trough 5 is lined with guiding blocks 6 in such a manner that this port has a shape similar to but somewhat larger than the pass 11 (see FIG. 3). A stream of molten glass 7 may flow from the trough 5 toward the roller pair 8 where it will be engaged by the adjoining lateral and horizontal portions of roller sections 9 and 10, as well as 9a and 10a, respectively.

It is necessary either to provide a new collecting trough 5 for each new pass 11, in conformity with a glass-member profile 12 to be achieved, or to carry out a new lining with the aid of the guiding blocks 6.

The surfaces of the roller pair 8 engaging the continuous glass melt can be provided with patterning (not shown) or have various profiles. These expedients, known in glass manufacture for similar purposes, are not described or illustrated herein.

Before the glass stream 7 reaches the roller pair 8, a device is arranged for the insertion of a reinforcing element 18, said device consisting of a delivery spool 16 and of one or more guiding rollers 17. It will be understood that the reinforcing element 18 is representative of a plain or corrugated wire mesh or like element adapted to stiffen the profiled glass members to be produced.

When profile members without reinforcement are produced, the roller pair 8 may remain in vertical alignment (without swivelling or offsetting one or both of the rollers).

The roller pair 8 is also provided with additional devices (not shown), such as a cooling device whose temperature is controlled by a thermostat. The cooling device may comprise a water-flow cooler adjacent the upper roller 9, 9a, and/or a splash cooler with provision for drying adjacent the lower roller 10, 10a.

Furthermore, the roller pair 8 is provided with continuously adjustable gear and drive means, preferably with a control device arranged between the melting furnace 2 and the feed trough 3 (not shown).

The roller pair 8 is followed by a conveyor having a separate drive means (not shown). Between the roller pair 8 and the inlet of a cooling furnace 15, the conveyor device comprises a pair of levelling rollers 13 or a plurality thereof, each having a pass congruent with the pass 11 of the roller pair 8; the conveyor also has conveying rollers 14. The individual elements of this conveyor device, especially the levelling roller pair or pairs 13, may be provided with an adjustable cooling provision (not illustrated). To eliminate the possible influence of cold air on the processed glass material, that is the profiled member 12, it is advantageous to provide a suitable baffling (not shown).

The collecting trough 5, the roller pair 8 and the levelling roller pairs 13 preferably form a self-contained and interchangeable unit. As has been explained hereinabove, this expedient allows almost uninterrupted manufacture even in case of changes from one profile to another.

Figure 4:
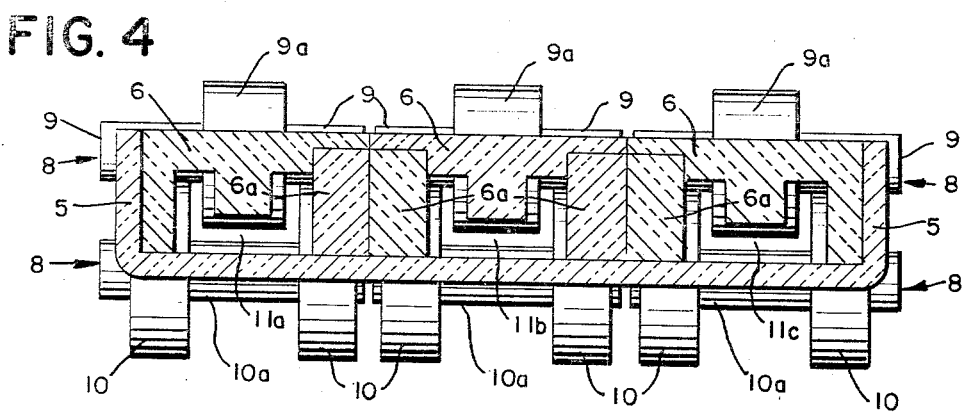
FIG. 4 is a view similar to that of FIG. 3, but illustrating the collecting-trough ports for three aligned pairs of rollers together with their respective passes.

FIG. 4 shows another embodiment in which, as a matter of example, three roller pairs 8 are arranged after the collecting trough 5, these rollers providing respective passes 11a, 11b and 11c between their portions 9, 9a and 10, 10a, as described before in connection with FIG. 3. In this case the long port of the trough 5 is separated by individual guiding blocks 6 in such a fashion that in front of each roller pair 8 the port section acquires a widened shape similar to that of the respective passes 11a–11c. It is advantageous to provide block members 6a between the guiding blocks 6, although the latter may be given the configuration illustrated in FIG. 3.

It is, of course, possible and within the scope of the invention to arrange after the collecting trough 5 a plurality of roller pairs 8 having different passes, e.g. as indicated by 11a, 11b and 11c (but shown with identical proportions for the sake of clear illustration), or, to provide a plurality of roller pairs 8 in conjunction with a single melting furnace 2, each pair being equipped with its own collecting trough (similar to FIG. 3). Individual conveyors can then be arranged for each roller pair 8, with suitable levelling roller pairs 13 and conveying rollers 14. Preferably, a common cooling furnace 15 is provided for this arrangement.

In operation of the apparatus, the stream of molten glass 1 flows from the furnace 2 through the trough 3 to the collecting trough 5. The molten glass 7, having reached here a certain level, is capable of flowing toward the pass 11 of the roller pair 8. Due to the particular shape given to the outlet port of the trough 5, the pressure exerted by the accumulated glass 7 is approximately equal at all sections of the pass 11. This assures that the glass flow is even at all points of the pass 11, as well, a fact which is of great importance for the uniformity of the cross-section of the profiled member 12 processed.

The member 12 is produced in a single rolling operation and the glass is simultaneously cooled off to a temperature at which the shape of the profile 12 imparted by the roller pair 8 is preserved, owing to the temperatures prevailing at the surfaces of the upper and lower rollers, 9, 9a and 10, 10a. A cooling to 700–900° C. proves advantageous inasmuch as no undesirable influence is hereby exerted on the glass structure.

Before continuous production of the profile members 12 starts, the roller pair 8 is heated to working temperature and during production the rollers are kept at this temperature by means of the above-mentioned cooling devices. It is possible to augment or accelerate cooling by air blasts during the rolling operation. Rolling speed of the pair 8 is adjusted by the action of the control mechanism on the continuously variable gear means in dependence on the level of the molten glass 1 in the furnace 2. In case of production breakdowns and during changeovers, it is possible to stop the flow of glass from the furnace to the collecting trough by means of the shut-off member 4 until production is resumed.

It is also possible to produce profiled glass members 12 with reinforcements. Wire or wire mesh is mostly used, as has been stated hereinabove, for element 18. The material is spooled off the delivery spool 16 and, guided by the roller or rollers 17, it enters the accumulated glass mass 7 in front of the roller pair 8 and is rolled into the profile member 12. A homogeneous bond is thus produced between the glass and the reinforcing element due to the high temperature at which the rolling is performed. Since shaping is achieved in a single operation, this bond cannot be again destroyed.

The profile member 12 is now transported over the conveyor to the cooling furnace 15. At this stage the profile member 12 is in a relatively hardened state but still far from being completely solidified. However, it is possible to hold the glass stable by means of the levelling rollers 13 and to correct possible deformations.

By that time the profile 12 has cooled off sufficiently to make the use of conveying rollers 14 possible after the profile has entered the cooling furnace 15. The glass member leaves the furnace 15 cooled off to room temperature and can thus be directed for further processing.

In the case of non-reinforced profile members, the conveyor speed is preferably higher than that of the roller pair 8, and in the case of reinforced members it is usually kept slightly lower. The differences in speed are, however, not critical enough adversely to affect the profiles 12.

In the case when the collecting trough 5, the roller pair 8 and the levelling roller pairs 13 are provided as an interchangeable unit it is possible to keep ready such a unit for a possible interchange or production switchover without affecting the current flow of production, and to effect a rapid interchange during breakdowns and when starting a new production batch.

When several pairs of rollers having different passes are assigned to a common melting furnace, it is possible individually to adjust their rolling speeds in relation to the quantity of glass they use.

Figure 5:
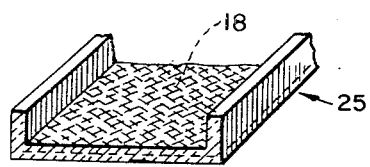
FIGS. 5–12 illustrate various profiled glass members, partly in section and partly in perspective views.
Figure 6:
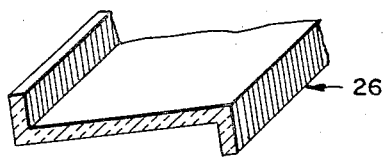
Figure 7:
Figure 8:
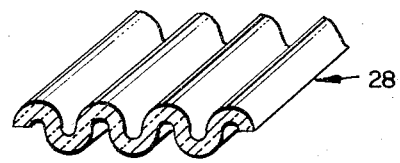
Figure 9:
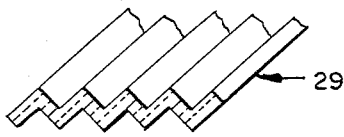
Figure 10:
Figure 11:
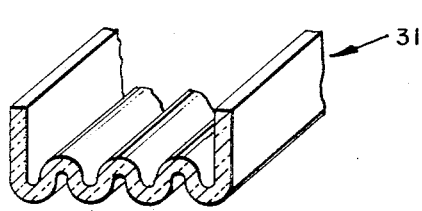
Figure 12:
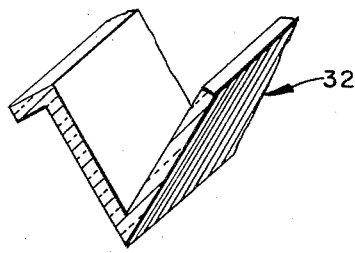

FIGS. 5–12 show various profiled glass members identified as 25–32, respectively, which can all be produced by the method and apparatus described hereinabove. It is, of course, possible to achieve a great variety of other desired profile shapes. In FIG. 5, as a matter of example, a reinforcing mesh 18 has been shown within the glass member 25.

Thus, it will be seen that with the apparatus of the present invention a continuous profiled glass member is formed in such a way that its final shape is determined upon movement of the glass through a single pass whose configuration is determined by the profiles of a single pair of cooperating shaping rollers which respectively have complementary projections and recesses arranged with the projections received in the recesses to define a non-planar pass giving the glass member a non-planar profile for its cross sectional configuration.

It should be understood, of course, that the foregoing disclosure relates only to a preferred embodiment of the invention and that it is intended to cover all changes and modifications of the examples described which do not constitute departures from the spirit and scope of the invention as set forth in the appended claims.

What is claimed is:

1. An apparatus for the continuous manufacture of a continuous profiled glass member, comprising, in combination, a collecting trough adapted to take up a stream of molten glass, said trough having an outlet port, a pair of shaping rollers situated one over the other adjacent the outlet port of said trough for receiving molten glass therefrom, the profiles of said rollers defining a pass for said molten glass which is somewhat narrower but similar to the shape of said port, said rollers being the only shaping rollers which determine the cross sectional configuration of the profiled glass member so that the latter is shaped upon movement through a single pass, and said rollers having complementary projections and recesses arranged with said projections extending into said recesses to provide a non-planar pass giving the glass member in cross section a non-planar profile.

2. An apparatus according to claim 1, wherein said port is deeper than said pass of the rollers.

3. An apparatus according to claim 2, further comprising a melting furnace for producing said molten glass, a feed trough between said furnace and said collecting trough, and shut-off means in the passage of said molten glass from said furnace to said collecting trough.

4. An apparatus according to claim 1, further comprising heating means for said collecting trough.

5. An apparatus according to claim 1, further comprising at least one pair of levelling rollers following said pair of shaping rollers to eliminate minor deformations, said levelling rollers defining a pass congruent with said pass of the shaping rollers.

6. An apparatus according to claim 5, wherein said collecting trough, said shaping rollers and said levelling rollers form a self-contained removable unit.

7. An apparatus according to claim 1, further comprising at least one additional outlet port and pair of shaping rollers beside the first-mentioned outlet port of said collecting trough and beside said first-mentioned pair of shaping rollers, respectively, to form a second continuous profiled glass member simultaneously with the first-mentioned glass member.

References Cited

UNITED STATES PATENTS

| | | | |
|---|---|---|---|
| 695,282 | 3/1902 | Cummings | 65—255 |
| 1,135,937 | 4/1915 | Franzen | 65—151 |
| 1,149,117 | 4/1915 | Diffrenbacker | 65—151 |
| 1,528,194 | 3/1915 | Burgess | 65—255 |
| 1,831,060 | 11/1931 | Duke | 65—93 |
| 1,934,798 | 11/1933 | Gelstharp | 65—93 |
| 2,122,083 | 6/1938 | Boudin et al. | 65—94 |
| 2,873,556 | 2/1959 | Hainke | 65—51 |
| 2,883,799 | 4/1959 | Wynne et al. | 65—255 |
| 3,162,708 | 12/1964 | Lund et al. | 264—175 X |

DONALL H. SYLVESTER, *Primary Examiner.*

S. LEON BASHORE, *Examiner.*

D. C. CRUPAIN, R. L. LINDSAY, *Assistant Examiners.*